Figure 3:
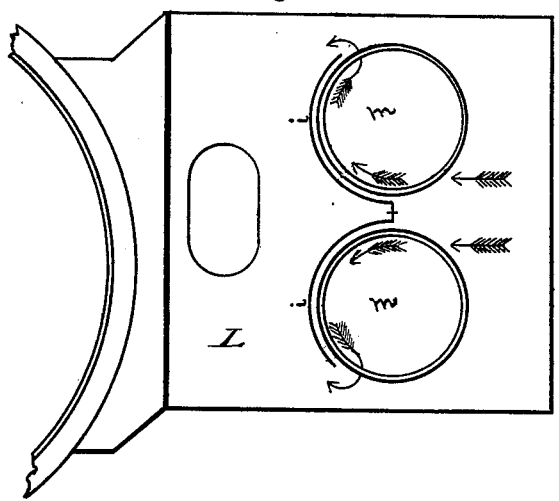

2 Sheets—Sheet 1.
F. H. ROOT.
Parlor-Stove.
No. 198,215. Patented Dec. 18, 1877.
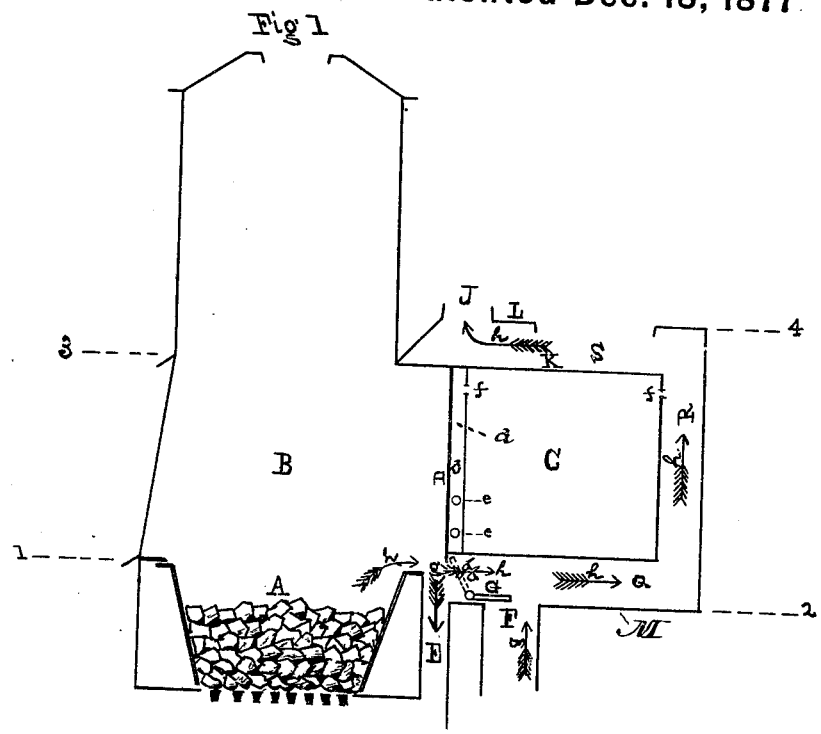
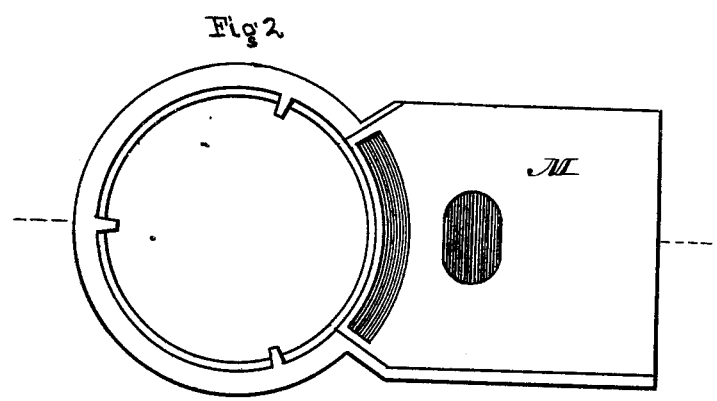
Witnesses,
Josiah Jewett.
Frederick H. Warren.
Inventor
F. H. Root
by H. H. Gibbs atty 2 Sheets—Sheet 2.

F. H. ROOT.
Parlor-Stove.

No. 198,215. Patented Dec. 18, 1877.

Witnesses
Josiah Jewett.
Frederick N. Warren.

Inventor
F. H. Root
by H. N. Gibbs atty

UNITED STATES PATENT OFFICE.

FRANCIS H. ROOT, OF BUFFALO, NEW YORK, ASSIGNOR TO JEWETT & ROOT, OF SAME PLACE.

IMPROVEMENT IN PARLOR-STOVES.

Specification forming part of Letters Patent No. 198,215, dated December 18, 1877; application filed April 24, 1877.

*To all whom it may concern:*

Be it known that I, FRANCIS H. ROOT, of Buffalo, in the county of Erie and State of New York, have invented an Improvement in Parlor-Stoves for Heating and Cooking, of which the following is a specification:

My invention consists in so constructing an oven and attaching it to an ordinary parlor heating-stove that the products of combustion may be taken directly from the surface of the fire, instead of conducting them through a downward or an upward flue, in order to surround the oven with sufficient heat for the purpose of baking, and in so arranging a damper that the products of combustion may also be carried to the base, as in any ordinary base-heating stove, before they are applied to the oven. By so arranging the oven, baking and boiling may be accomplished more readily, and without necessitating the heating of the base of the stove when not desired.

I am aware that prior to my invention stationary ovens of various descriptions have been applied to heating-stoves, none of which resembles this in construction. This oven can be used on direct-draft as well as diving-flue stoves. As regards the general conformation of the stove, it is the same as any ordinary parlor heating-stoves now in use.

I will now proceed to describe my invention, reference being had to the accompanying drawings, in which—

Figure 1 is a vertical section of a sufficient portion of a parlor heating-stove to illustrate my invention. Fig. 2 is a view of the bottom of the oven, which is made in connection with, and is a sectional or integral part of, the ring which secures the fire-pot in its place, taken at the lines 1 2. Fig. 3 is a view of the top of the oven and boiler-holes, which is made in connection with, and is a sectional or integral part of, the ring which secures the illuminating-sections of the combustion-chamber, taken at the lines 3 4.

A is the fire-pot. B is the combustion-chamber. G is a damper. D is a fire-guard, which is made of sufficient thickness to withstand the action of the heat, and at the same time forming the outer wall of the air-chamber $a$. C is the oven.

The air-chamber $a$ serves the double purpose of protecting the oven from intense heat and of supplying a circulation by taking in cold air through the apertures $e\ e$, passing it upward through the air-chamber, and thereby becoming heated, and passing through the apertures $f f$, ventilating the oven.

I do not confine myself as to the position of the apertures $f f$, as they may be placed in any location the most conducive to a thorough ventilation of the oven.

E is a downward flue, and F is an upward flue.

When the damper G is closed, as shown by the dotted lines $b\ b$, the products of combustion are made to pursue the course of the arrows $g\ g$, passing downward through the flue E and upward through the flue F, or as in any ordinary base-heater, the details of which I consider unnecessary to illustrate, as my invention is applicable to direct-draft as well as diving-flue stoves.

When the damper G is thrown down, as shown, the products of combustion pass directly from the surface of the fire, following the course of the arrows marked $h$ to the exit-pipe J. In thus taking the products of combustion directly to and around the oven, I lose none of the heat.

The curved flue-strips $i\ i$, Fig. 3, partially surrounding the boiler-holes $m\ m$, are for the purpose of retaining the heat around a boiler or kettle, or under the holes, instead of allowing it to pass in a direct line to the exit-pipe J.

Having described my invention, what I claim, and desire to secure by Letters Patent, is—

An oven placed between the upper and lower rings, and in combination therewith of the illuminating-section of a parlor-stove, as described and set forth.

In testimony whereof I have signed my name to this specification in the presence of two subscribing witnesses.

FRANCIS H. ROOT.

Witnesses:
JOSIAH JEWETT,
FREDERIC H. WARREN.